(12) United States Patent
Queinnec

(10) Patent No.: US 6,319,111 B1
(45) Date of Patent: *Nov. 20, 2001

(54) HEATING AND/OR AIR CONDITIONING DEVICE FOR A VEHICLE PASSENGER COMPARTMENT WITH IMPROVED AIR MIXING

(75) Inventor: Jean-Yves Queinnec, Elancourt (FR)

(73) Assignee: Valeo Climatisation (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/446,855
(22) PCT Filed: Apr. 28, 1999
(86) PCT No.: PCT/FR99/01003
§ 371 Date: Dec. 28, 1999
§ 102(e) Date: Dec. 28, 1999
(87) PCT Pub. No.: WO99/55545
PCT Pub. Date: Nov. 4, 1999

(30) Foreign Application Priority Data
Apr. 29, 1998 (FR) .................................................. 98 05396

(51) Int. Cl.⁷ ..................................................... B60H 1/26
(52) U.S. Cl. ............................................................ 454/121
(58) Field of Search ................................... 454/121, 124, 454/127

(56) References Cited

U.S. PATENT DOCUMENTS

| 5,052,282 | * | 10/1991 | Scharamm et al. ................. 454/121 |
| 5,338,249 | * | 8/1994 | Hildebrand et al. ............. 454/121 X |
| 5,476,418 | * | 12/1995 | Loup .................................... 454/121 |
| 5,779,535 | * | 7/1998 | Bendell et al. ..................... 454/121 |
| 5,791,981 | * | 8/1998 | Drobner ......................... 454/121 X |
| 6,032,723 | * | 3/2000 | Tsuihiji et al. ................... 454/121 X |

OTHER PUBLICATIONS

International Search Report dated Jul. 30, 1999.

* cited by examiner

Primary Examiner—Harold Joyce
(74) Attorney, Agent, or Firm—Morgan & Finnegan, LLP

(57) ABSTRACT

A heating and/or air conditioning device for a vehicle passenger compartment comprising an air mixing chamber adapted to be supplied with treated air by communicating with a defrost outlet, a ventilating outlet and an outlet for the feet. The defrost outlet and the ventilating outlet are adjacent and defined by a common duct, and said outlets are controlled by two throttle valve-type flaps housed in the common duct and comprising each at least a first couple of wings controlling the defrost outlet and at least a second couple of wings controlling the ventilating outlet, the two flaps being mounted pivoting about parallel axes between an aerating position and a defrosting position.

11 Claims, 4 Drawing Sheets

HEATING AND/OR AIR CONDITIONING DEVICE FOR A VEHICLE PASSENGER COMPARTMENT WITH IMPROVED AIR MIXING

BACKGROUND OF THE INVENTION

This invention relates to a heating and/or air conditioning apparatus for the cabin of a vehicle, comprising a mixing chamber adapted to be supplied with processed air and in communication with a deicing outlet, a ventilating outlet and a foot level outlet, together with distribution means adapted to control the said outlets.

In known apparatuses of this type, the mixing chamber receives a stream of air the temperature of which is adjusted, as a result of the mixing of a stream of cold air with a stream of hot air in a controllable proportion. To this end, such an apparatus commonly comprises a cold air branch and a hot air branch, which are controlled by at least one valve, a so-called "mixing valve", which may be a curtain-type valve, a butterfly valve, a pivoted flap valve, a cock, and so on.

The mixing chamber which receives the stream of processed air (that is to say cold air, hot air, or conditioned air) in its turn feeds the three above mentioned outlets. The deicing outlet is in communication with one or more vents which are arranged at the base of the windshield of the vehicle, the ventilating outlet being in communication with ventilators arranged on the fascia panel, while the foot level outlet is in communication with vents arranged in the lower part of the cabin, in the region of the feet of the occupants.

The distribution of the processed air between the three outlets mentioned above is effected by distribution means which consist generally of valves, the position of which can be adjusted by the user according to the degree of atmospheric comfort desired.

Thus, apparatuses of the above mentioned type are known in which the deicing outlet, the ventilating outlet and the foot level outlet are formed in separate ducts, and the distribution of the air between these outlets is obtained by means of separate valves, the main disadvantage of which is that it increases the overall bulk of the apparatus.

It is also known to arrange the deicing outlet and the ventilating outlet in a common duct, and to control the said outlets by means of a single valve. However, this solution makes it necessary to employ a very large valve having a large angular displacement, which again generates bulk problems.

In addition, these known solutions have the disadvantage that the above mentioned valves are supplied with air at a temperature which is not homogeneous.

An object of the invention is essentially to overcome the above mentioned drawbacks.

BRIEF SUMMARY OF THE INVENTION

To this end, it proposes an apparatus of the type defined in the introduction, in which at least two outlets selected from the said deicing outlet, ventilating outlet and foot level outlet are adjacent and are bounded by a common duct, and the distribution means include at least two valves of the butterfly type which are mounted within the common duct, each valve having at least two pairs of vanes each of which controls one of the said air outlets.

Thus, the control of at least one of the outlets is obtained through at least two butterfly valves, which are mounted in a common duct and each of which has at least two pairs of vanes.

These two vanes are smaller in size than a single valve, and in addition they have smaller displacements, which means that they intrude less on the volume of the mixing chamber. This results in an improvement in the quality of the mixture of cold air and hot air.

In a preferred embodiment, each valve has at least one first pair of vanes controlling a first air outlet, and at least one second pair of vanes controlling a second air outlet. The said valves are mounted for pivoting movement about parallel axes between a first position in which the first pairs of vanes together close off the first outlet, while the second pairs of vanes together leave the second outlet open, and a second position in which the first pairs of vanes together leave the first outlet open, while the second pairs of vanes together close off the second outlet.

Preferably, the first outlet is the deicing outlet and the second outlet is the ventilating outlet.

In a preferred embodiment, an outlet selected from the ventilating, deicing and foot level outlets is divided into two parts, which occupy two side regions of the common duct and which flank the other one of the said outlets, which occupies a central region of the said common duct, and each of the valves has a pair of central vanes flanked by two pairs of side vanes.

Preferably, the ventilating outlet occupies the side regions of the common duct, while the deicing outlet occupies the central region.

According to another feature of the invention, the first pair of vanes and the second pair of vanes of each valve are offset angularly.

In one embodiment, the vanes of the first pair of vanes, and the vanes of the second pair of vanes, are substantially coplanar in at least one of the valves.

In a further embodiment, the vanes of the first pair of vanes, and the vanes of the second pair of vanes, define an obtuse angle between them in at least one of the valves.

According to a further preferred feature of the invention, in the ventilating position, the respective vanes of the first pairs of vanes are substantially coplanar whereby together to close off the deicing outlet, while, in the deicing position, the respective vanes of the second pairs of vanes are substantially coplanar whereby together to close off the ventilating outlet.

The invention also provides that the apparatus includes control means for effecting coordinated pivoting movement of the valves.

In one embodiment, the control means act in such a way as to cause the valves to pivot in the same direction.

By way of example, the control means may comprise two toothed sectors, which are rotatable together and which are adapted to mesh respectively with two pinions, which are mounted on the respective axes of the two valves.

BRIEF DESCRIPTION OF THE DRAWINGS

In the following description, which is given by way of example only, reference is made to the attached drawings, in which.

DETAILED DESCRIPTION OF THE INVENTION

Figure 1:
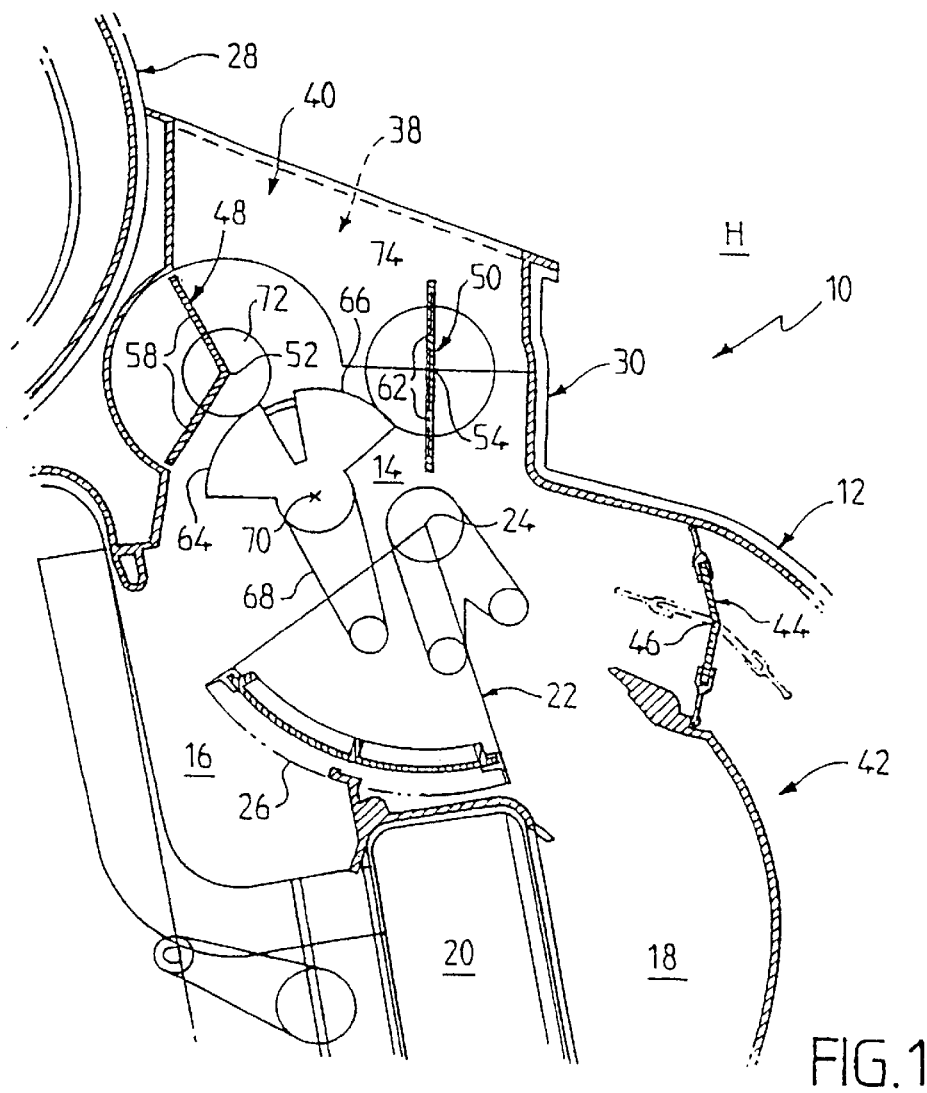
FIG. 1 is a partial view in cross section, showing a heating and/or air conditioning apparatus in a first embodiment of the invention, which is shown in the ventilating position, the cross section being taken on the line I—I in FIG. 2.

Reference is first made to FIG. 1, which shows an apparatus 10 for heating the cabin of a motor vehicle. The apparatus comprises a casing 12 (part of which is shown) in which is defined a mixing chamber 14 which is at the outlet of a cold air branch 16 and a hot air branch 18. The latter contains a heat exchanger 20 which consists of a radiator, through which there passes the fluid which serves for cooling the engine of the vehicle. A mixing valve 22, of the drum type, is mounted in the mixing chamber 14 and includes a circular cylindrical wall 26. The branches 16 and 18 are supplied with air which is delivered in a forced draught by a blower 28 (part of which is shown).

The mixing valve 22 is able to pivot between two extreme positions corresponding, respectively, to a "hot only" position and a "cold only" position, and can also occupy intermediate positions. As a result of this, the mixing chamber 14 can be fed with air at a regulated temperature, in a manner which is known per se.

The mixing chamber 14 is in communication with a common duct 30 (FIGS. 1 and 2), which has a rectangular cross section bounded by two longitudinal walls 32 that extend parallel to the axis 24 of the valve 22, together with two side walls 34.

The duct 30 is divided internally by two oblique walls 36 (FIGS. 1 and 2) in three regions, namely a central region 38 which corresponds to a deicing outlet, and two side regions 40 which constitute a ventilating outlet.

The deicing outlet 38 is arranged to feed deicing/demisting vents for the windshield, while the ventilating outlet 40, which is duplicated, is arranged to feed ventilators which are situated mainly on the fascia panel (not shown) of the vehicle.

Finally the mixing chamber 14 feeds a lower outlet 42, called a "foot level outlet", which leads to one or more vents (not shown) which are open into the lower part of the cabin H in the region of the feet of the occupants. The outlet 42 is controlled by a pivoting valve 44 of the butterfly type, which is mounted for pivoting movement about an axis 46. The outlet 42 feeds at least one ventilator which is arranged in the lower part of the cabin.

Figure 2:
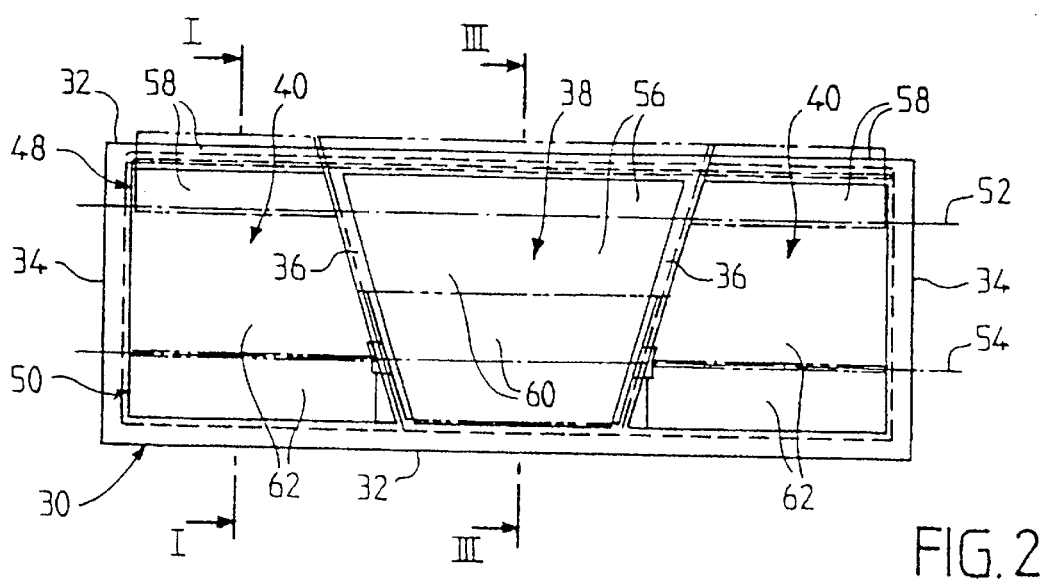
FIG. 2 is a top plan view in the direction of the arrow II in FIG. 1.

Two valves 48 and 50 of the butterfly type are mounted in the duct 30 for pivoting movement about respective axes 52 and 54 (FIGS. 1 and 2). These axes are parallel to each other and parallel to the longitudinal sides 32 of the duct 30.

Figure 5:
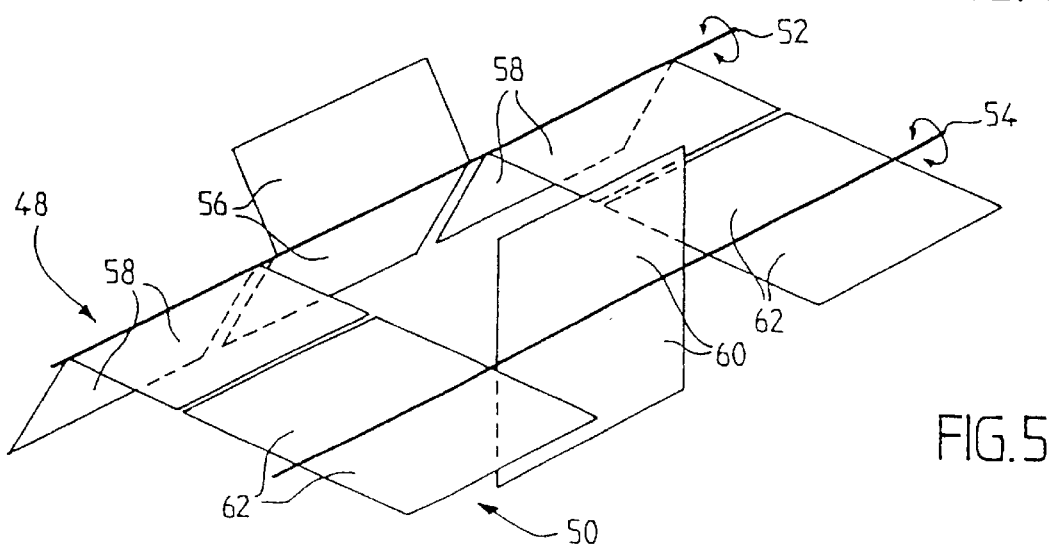
FIG. 5 is a diagrammatic perspective view showing the structure of the two valves in the deicing position.
Figure 6:
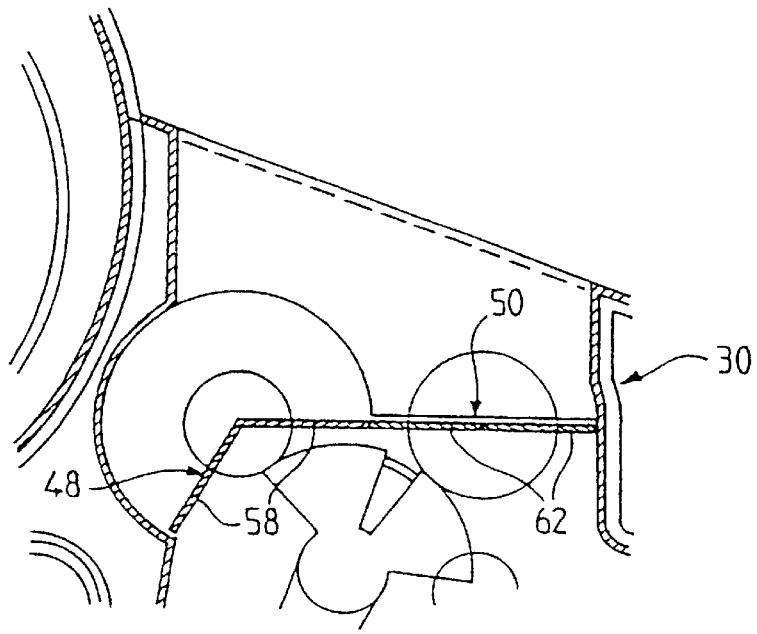
FIG. 6 is a view similar to FIG. 1, in which the valves are shown in the deicing position.
Figure 7:
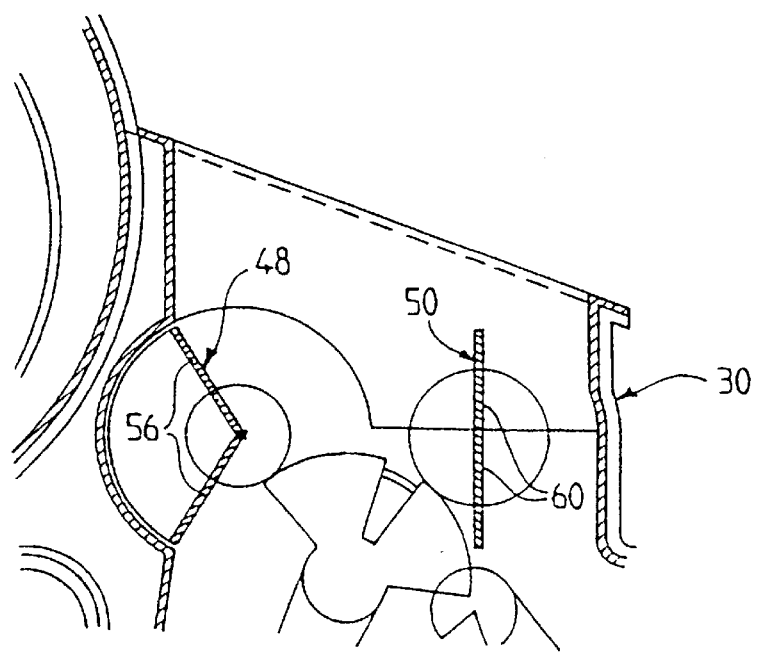
FIG. 7 is a view similar to FIG. 3, in which the valves are shown in the deicing position.

The valve 48 (FIGS. 2 and 5) has a first pair of vanes consisting of two vanes 56 of the butterfly type which make an angle of approximately 120° between them. These two vanes are arranged to be displaced within the central region of the duct that constitutes the deicing outlet. On either side of the first pair of vanes 56, there are disposed two second vane pairs, each of which consists of two vanes 58 which define between them an angle of approximately 120°, the two pairs of vanes 58 having the same angular offset and being offset angularly with respect to the first pair of vanes 56. The two pairs of vanes 58 are arranged to be displaced respectively in the two side regions that constitute the ventilating outlet 40.

The valve 50 includes a first vane pair consisting of two vanes 60 of the butterfly type, which are situated in substantially the same plane and which are located on a central portion of the axis 54. Two second pairs of vanes 62, again of the butterfly type, are disposed on either side of the pair of vanes 60. The two pairs of vanes 62 are coplanar, and have an angular offset of about 90° with respect to the first pair of vanes 60.

The first pair of vanes 56 of the valve 48, and the first pair of vanes 60 of the valve 50, are arranged to cooperate with each other so as to open or close the deicing outlet 38, while the second pairs of vanes 58 of the valve 48 and the second pairs of vanes 62 of the valve 50 are arranged to cooperate with each other for opening or closing the ventilating outlet 40.

As can be seen in FIG. 1, the apparatus includes control means for effecting coordinated pivoting movement of the valves 48 and 50. These control means consist of two toothed sectors 64 and 66 which are fixed to a lever 68 mounted for pivoting movement about an axis 70. The sectors 64 and 66 are respectively in mesh with two pinions 72 and 74, which are mounted on the axes 52 and 54 of the valves respectively. These valves are able to pivot in the same direction between two extreme positions under the action of the control means, the angular displacement of the valve 48 being greater than 90°, while that of the valve 50 is approximately 90°.

Figure 3:
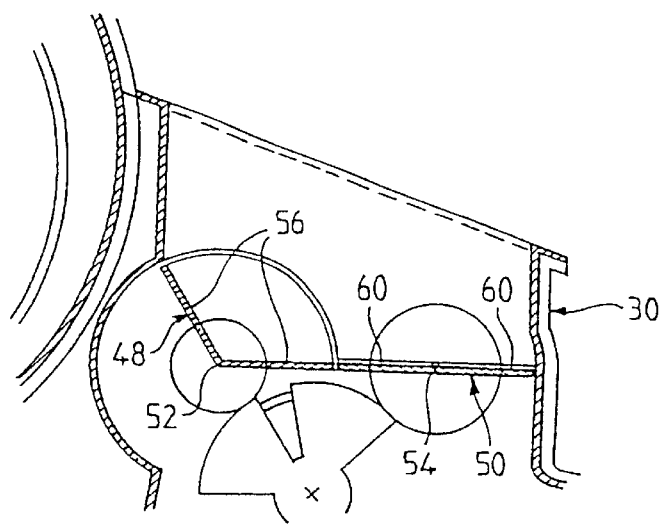
FIG. 3 is a view, partly in cross section taken on the line III—III in FIG. 2, showing the apparatus in its ventilating position.
Figure 4:
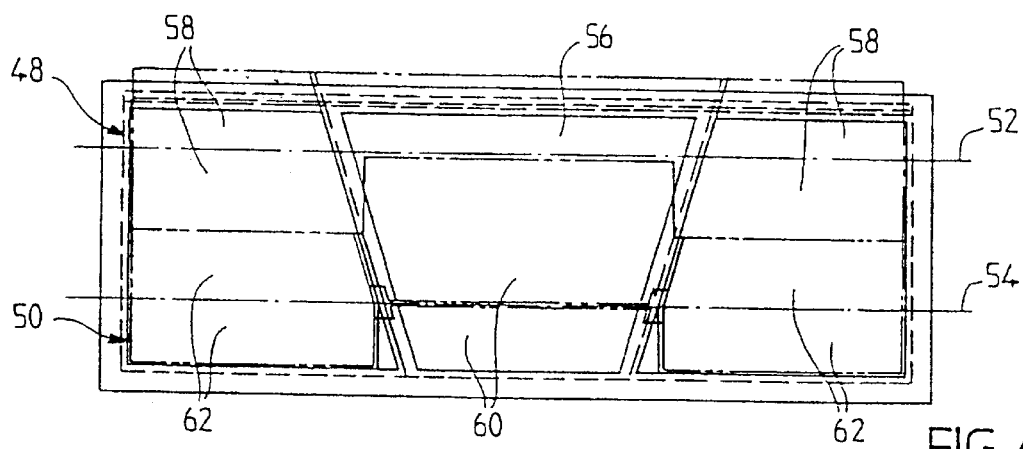
FIG. 4 is a view similar to FIG. 2, in which the valves are shown in the deicing position.

In the ventilating position (FIGS. 1, 2 and 3), a vane 56 of the valve 48 lies in the same plane as a vane 60 of the valve 50, and they accordingly together obturate the deicing outlet 38 (FIG. 3). In this particular position, the vanes 58 of the valve 48 and the vanes 62 of the valve 50 are spaced apart from each other (FIG. 1), so that a stream of processed air from the mixing chamber 14 is able to pass through the two side regions of the duct.

The valves can pivot to another extreme position, called the deicing position, as shown in FIGS. 4 to 7.

In the deicing position, in each side region of the duct, a vane 58 of the valve 48 lies in substantially the same plane as a vane 62 of the valve 50, so that together they close off the ventilation outlet 40. On the other hand, the vanes 56 of the valve 48 and the vanes 60 of the valve 50 are spaced apart from each other, which enables a stream of air from the mixing chamber 14 to pass through the central region of the duct. The valves can of course occupy other intermediate positions which enable the stream of air to pass both through the deicing outlet and through the ventilating outlet.

Reference is now made to FIGS. 8 to 11, which show a modified embodiment of the invention. The main difference lies in the fact that the respective vanes of each pair of vanes in the valve 50 are not coplanar with each other as in the preceding embodiment, but they define between them an obtuse angle in the region of 170°. This particular arrangement enables the valve 50 to be offset further towards the upper end (as seen in the drawings) of the duct 30.

Figure 8:
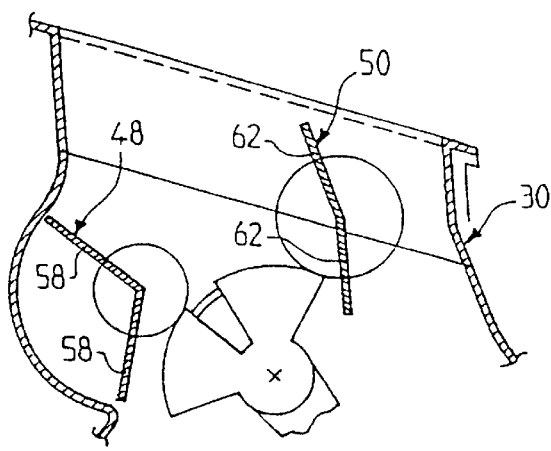
FIGS. 8 and 9 are views in cross section similar to FIGS. 1 and 3, for a second embodiment of the invention.
Figure 9:
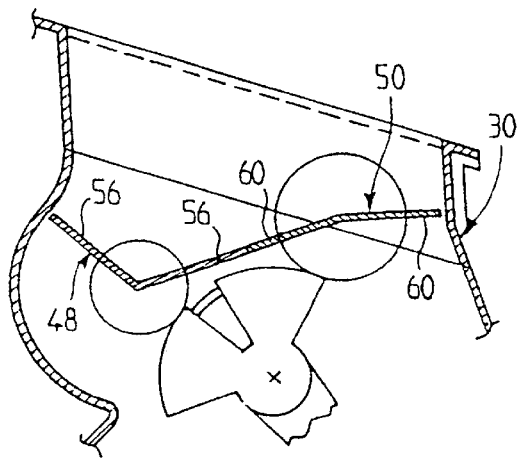
Figure 10:
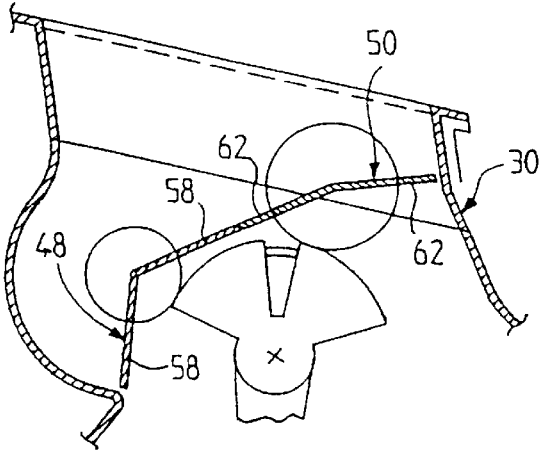
FIGS. 10 and 11 are views in cross section similar to FIGS. 6 and 7, for the said second embodiment.
Figure 11:
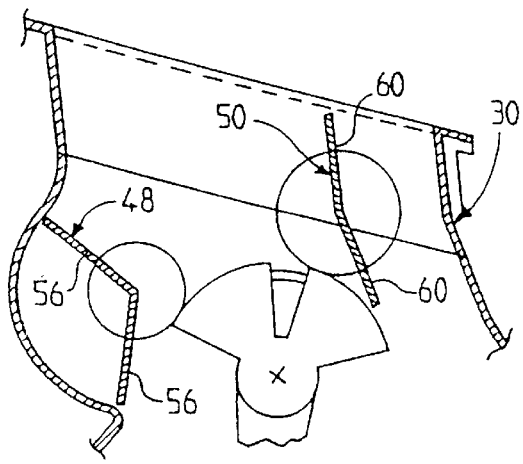

In FIGS. 8 and 9 the valves are shown in the ventilating position. The pairs of vanes 58 and 62 are spaced apart to enable a stream of air (FIG. 8) to pass through, while one of the vanes 56 lies in the same plane as a vane 60 (FIG. 9), which enables the deicing outlet to be completely closed off.

In the deicing position (FIGS. 10 and 11), the vanes 58 and 62 contribute to the closing off of the ventilating outlet (FIG. 10), while the vanes 56 and 60 are spaced apart so as to leave the deicing outlet open.

The arrangement according to the invention, with two valves, enables the size of the apparatus to be reduced, given that the size of the two valves, and their displacement, are more limited than in the case of a single valve. In addition, it enables more homogeneous air temperatures to be obtained between the various vents.

The lever 68 is coupled to control means (not shown), which also govern the pivoting movement of the mixing valve 62 and that of the valve 44 according to the atmospheric comfort conditions desired by the occupants of the vehicle.

The invention is of course not limited to the embodiments described above by way of example, and does extend to other versions. The mixing of the streams of cold air and hot air can be obtained by means of a mixing valve of a different type. In addition, control of the valves 48 and 50 can be obtained by means of other mechanical means having various kinematic characteristics.

What is claimed is:

1. A heating and/or air conditioning apparatus for the cabin of a vehicle, comprising a mixing chamber adapted to be supplied with processed air and in communication with a deicing outlet, ventilating outlet and a foot level outlet, together with distribution means adapted to control the said outlets, wherein at least two outlets selected from the deicing outlet, ventilating outlet and foot level outlet are adjacent and are bounded by a common duct, and wherein the distribution means include at least two valves of the butterfly type which are mounted within the common duct, each valve having at least two pairs of vanes each of which controls one of the said air outlets, wherein the vanes of each said valve pivot about a different axis than the vanes of each of the other said valves, wherein one of the outlets selected from the ventilating outlet, the deicing outlet and the foot level outlet is divided into two parts, which occupy two side regions of the common duct and which flank the other one of the said outlets, which occupies a central region of the common duct, and wherein each of the valves has a pair of central vanes flanked by two pairs of said vanes.

2. An apparatus according to claim 1, wherein each valve has at least one first pair of vanes controlling a first air outlet of said selected outlets, and at least one second pair of vanes controlling a second air outlet of said selected outlets, and wherein the said valves are mounted for pivoting movement about parallel axes between a first position in which the first pairs of vanes together close off the first outlet, while the second pairs of vanes together leave the second outlet open, and a second position in which the first pairs of vanes together leave the first outlet open, while the second pairs of vanes together close off the second outlet.

3. An apparatus according to claim 2, wherein the first outlet is the deicing outlet and the second outlet is the ventilating outlet.

4. An apparatus according to claim 1, wherein the ventilating outlet occupies the side regions of the common duct, while the deicing outlet occupies the central region of the duct.

5. An apparatus according to claim 1, wherein the first pair of vanes and the second pair of vanes of each valve are offset angularly.

6. An apparatus according to claim 1, wherein at least one of the valves, the vanes of the first pair of vanes, and the vanes of the second pair of vanes are substantially coplanar.

7. An apparatus according to claim 1, wherein at least one of the valves, the vanes of the first pair of vanes and the vanes of the second pair of vanes define an obtuse angle between them.

8. An apparatus according to claim 1, wherein in the ventilating position, the respective vanes of the first pairs of vanes are substantially coplanar whereby together to close off the deicing outlet, and wherein in the deicing position, the respective vanes of the second pairs of vanes are substantially coplanar whereby together to close off the ventilating outlet.

9. An apparatus according to claim 1, wherein it includes control means for effecting coordinated pivoting movement of the valves.

10. An apparatus according to claim 9, wherein the control means act in such a way as to cause the valves to pivot in the same direction.

11. An apparatus according to claim 10, wherein the control means comprise two toothed sectors, which are rotatable together and which are adapted to mesh respectively with two pinions, which are mounted on the respective axes of the two valves.

* * * * *